US008594851B1

(12) United States Patent
Smaidris

(10) Patent No.: US 8,594,851 B1
(45) Date of Patent: Nov. 26, 2013

(54) WASTEWATER COLLECTION FLOW MANAGEMENT SYSTEM AND TECHNIQUES

(75) Inventor: Thomas F. Smaidris, Melbourne, FL (US)

(73) Assignee: Data Flow Systems, Inc., Melbourne, FL (US)

( * ) Notice: Subject to any disclaimer, the term of this patent is extended or adjusted under 35 U.S.C. 154(b) by 1670 days.

(21) Appl. No.: 11/958,430

(22) Filed: Dec. 18, 2007

Related U.S. Application Data

(60) Provisional application No. 60/870,862, filed on Dec. 20, 2006.

(51) Int. Cl.

| | |
|---|---|
| ***G05D 7/00*** | (2006.01) |
| ***E03B 1/00*** | (2006.01) |
| ***F23N 1/00*** | (2006.01) |
| ***G05D 11/00*** | (2006.01) |
| ***G08B 21/10*** | (2006.01) |

(52) U.S. Cl.
USPC ................... 700/282; 137/2; 137/88; 137/94; 137/101.19; 137/115.02; 340/606; 340/612; 340/613; 340/614; 340/615; 340/616; 340/617; 340/618; 340/619; 417/121; 417/122; 417/123; 417/124; 417/125; 417/126; 417/127; 417/128; 417/129; 417/130; 417/131; 417/132; 417/133; 417/134; 417/135; 417/136; 417/137; 417/138

(58) Field of Classification Search
USPC .................. 417/121–139; 340/606, 612–619; 137/2, 88, 94, 101.19, 115.02, 115.03; 700/282; 210/97
See application file for complete search history.

(56) References Cited

U.S. PATENT DOCUMENTS

| | | | | |
|---|---|---|---|---|
| 3,703,960 A | | 11/1972 | Kennedy | |
| 3,716,139 A | | 2/1973 | Turner | |
| 3,760,946 A | | 9/1973 | Boler | |
| 3,776,252 A | | 12/1973 | Wilcox | |
| 3,839,198 A | | 10/1974 | Shelef | |
| 3,844,946 A | * | 10/1974 | Farrell, Jr. | 210/104 |
| 3,853,764 A | | 12/1974 | Armstrong | |
| 3,901,807 A | * | 8/1975 | Trump | 210/198.1 |
| 3,920,550 A | * | 11/1975 | Farrell et al. | 210/86 |
| 3,925,206 A | * | 12/1975 | Dea | 210/104 |
| 3,937,596 A | * | 2/1976 | Braidwood | 417/36 |
| 4,025,237 A | * | 5/1977 | French | 417/131 |
| 4,036,754 A | * | 7/1977 | Peasley | 210/139 |
| 4,049,013 A | * | 9/1977 | Shenk | 137/263 |
| 4,122,013 A | * | 10/1978 | Greenleaf et al. | 210/195.3 |

(Continued)

OTHER PUBLICATIONS

Schutze et al., "Real Time Control of Urban Wastewater Systems—Where Do We Stand Today?" 2004, Elsevier, 335-348 pg.*

(Continued)

*Primary Examiner* — Kavita Padmanabhan
*Assistant Examiner* — Thomas Stevens
(74) *Attorney, Agent, or Firm* — Mark R. Malek; G. Philip J. Zies; Zies, Widerman & Malek

(57) ABSTRACT

Reductions in energy consumption and maintenance requirements for operating a wastewater treatment plant are achieved by controlling the operation of pumps at pump stations along a force main in a systematic fashion. The operation of the pumps is controlled to manage the flow of wastewater along the force main to minimize energy consumption, to eliminate sediment, to manage peak pressures encountered by smaller pumps and to avoid septic conditions.

16 Claims, 14 Drawing Sheets

WW TREATMENT PLANT

(56) References Cited

U.S. PATENT DOCUMENTS 4,125,093 A 11/1978 Platzer, Jr.
4,193,869 A * 3/1980 Brucker et al. ............... 210/705
4,341,504 A * 7/1982 Hignutt et al. .................... 417/8
4,387,020 A * 6/1983 Hill ................................ 210/86
4,487,699 A * 12/1984 Long, Jr. ....................... 210/760
4,526,188 A 7/1985 Olsson et al.
4,582,612 A * 4/1986 Long, Jr. ....................... 210/760
4,622,134 A * 11/1986 Kobayashi .................... 210/127
4,675,116 A * 6/1987 Hoyland ....................... 210/709
4,716,536 A * 12/1987 Blanchard ..................... 702/100
4,801,246 A * 1/1989 Baumberg .................... 417/121
4,818,392 A * 4/1989 Werner et al. .............. 210/195.3
4,821,580 A * 4/1989 Jorritsma ........................ 73/861
4,913,180 A * 4/1990 Anderson, Jr. .................... 137/2
4,925,564 A 5/1990 Francis
4,944,886 A 7/1990 Masri
4,976,863 A * 12/1990 Stearns ......................... 210/608
5,021,161 A * 6/1991 Calltharp ...................... 210/614
5,027,661 A * 7/1991 Desaulniers et al. ........... 73/861
5,039,404 A 8/1991 Norcross
5,076,767 A * 12/1991 Desaulniers et al. ......... 417/426
5,128,029 A * 7/1992 Herrmann ..................... 210/107
5,135,361 A * 8/1992 Dion ............................... 417/62
5,190,442 A * 3/1993 Jorritsma .......................... 417/7
5,228,996 A 7/1993 Lansdell
5,348,650 A * 9/1994 Cummings, Jr. .............. 210/199
5,360,556 A * 11/1994 Ball et al. ...................... 210/804
5,540,555 A * 7/1996 Corso et al. .................. 417/44.2
5,591,010 A * 1/1997 Van Zyl .......................... 417/12
5,597,960 A 1/1997 Beaudoim
5,626,684 A * 5/1997 Rodarte et al. ............. 134/22.12
5,647,977 A 7/1997 Arnaud
5,647,986 A * 7/1997 Nawathe et al. .............. 210/608
5,687,092 A * 11/1997 Bretmersky et al. .......... 702/100
5,855,791 A * 1/1999 Hays et al. .................... 210/696
5,971,303 A * 10/1999 Pugh-Gottlieb ......... 241/46.013
6,048,175 A * 4/2000 Corlew et al. ................. 417/120
6,148,838 A * 11/2000 Tsay et al. ........................ 137/2
6,178,393 B1 * 1/2001 Irvin ............................... 703/10
6,217,770 B1 4/2001 Haney et al.
6,241,485 B1 * 6/2001 Warwick ....................... 417/300
6,312,589 B1 * 11/2001 Jarocki et al. ................... 210/87
6,356,205 B1 * 3/2002 Salvo et al. ................ 340/853.3
6,378,554 B1 * 4/2002 Struthers .................. 137/565.29
6,408,471 B1 * 6/2002 Teran et al. ....................... 8/158
6,491,060 B2 12/2002 Struthers
6,601,005 B1 7/2003 Eryurek et al.
6,625,519 B2 9/2003 Goodwin et al.
6,669,839 B2 12/2003 Tipton et al.
6,721,683 B2 * 4/2004 Harris et al. .................. 702/183
6,757,623 B2 6/2004 Schutzbach et al.
6,770,198 B2 8/2004 Newton et al.
6,782,301 B2 * 8/2004 Maruyama ...................... 700/97
6,807,494 B2 10/2004 Schutzbach et al.
6,960,304 B1 * 11/2005 Brown et al. ................. 210/749
7,002,481 B1 * 2/2006 Crane et al. ................... 340/618
7,028,700 B2 * 4/2006 Wheat et al. ...................... 137/2
7,075,425 B2 * 7/2006 Capano et al. ................ 340/531
7,081,203 B2 7/2006 Helm
7,083,720 B2 8/2006 Miller
7,233,252 B1 * 6/2007 Hardin .......................... 340/606
7,255,233 B2 8/2007 Daniels et al.
7,289,923 B2 10/2007 Marovitz
7,342,504 B2 * 3/2008 Crane et al. ................... 340/612
7,452,468 B2 * 11/2008 Smith ........................... 210/616
7,699,985 B2 * 4/2010 Cote et al. ..................... 210/615
7,768,413 B2 * 8/2010 Kosuge et al. ................ 340/612
7,905,245 B2 * 3/2011 McQuade et al. .............. 137/88
7,950,464 B2 5/2011 Atencio et al.
2002/0005220 A1 * 1/2002 Struthers .................. 137/565.29
2002/0030003 A1 * 3/2002 O'Leary et al. ............... 210/151
2004/0105781 A1 * 6/2004 Polak ............................. 422/37
2006/0089752 A1 * 4/2006 Voigt ............................ 700/282
2007/0069050 A1 * 3/2007 Gutwein et al. ................ 241/21
2007/0267070 A1 * 11/2007 Kuhnle et al. .............. 137/564.5
2008/0082215 A1 * 4/2008 McDowell .................... 700/282
2009/0236092 A1 * 9/2009 O'Brien ........................ 166/256
2009/0283457 A1 11/2009 Buchanan et al.
2011/0162738 A1 * 7/2011 Kuhnle et al. .............. 137/564.5
2012/0222994 A1 9/2012 Smaidris et al.

OTHER PUBLICATIONS

Tevjashev et al., "Inforamtional Analytical System of Control of Master Schedules of Sewer Pump Station", IEEE, 2004, 1 pg.*

Barritt-D.R., 'Ensuring Public Safety in PLC Controlled Water Treatment Plant' IEEE1994, 10 pg.*

Control Engineering Company, "Utility Integrates Control Across 41 Remote Stations", 2005, vol. 52, 2pg.*

Chapin-J., "Municipal Wastewater Pump Station Design Problems and Solutions", Water Environment Foundation, Sep. 27, 2006, 8 pages.*

* cited by examiner

EXEMPLARY PUMP STATION

SEDIMENT ELIMINATION

SEPTIC ELIMINATION

WASTEWATER COLLECTION FLOW MANAGEMENT SYSTEM AND TECHNIQUES

CROSS REFERENCE TO RELATED APPLICATIONS

This application claims priority to provisional application Ser. No. 60/870,862, filed on Dec. 20, 2006, entitled "Wastewater Collection Flow Management System" the contents of which are hereby incorporated into this application by reference in its entirety.

BACKGROUND OF THE INVENTION

1. Field of the Invention

The present invention relates in general to wastewater collections systems for wastewater treatment plants, and is particularly directed to pump management, wastewater treatment plant inflow management, sediment elimination, pressure management and septic elimination in wastewater collection systems, wherein an improvement to the operation of wastewater collection systems is made by modulating the operation of the pumping stations systematically, rather than allowing pumps to operate independently.

2. Description of the Prior Art

In a wastewater collection service area, many pump stations often pump wastewater to a treatment facility or to a master pump station through a force main. Force mains are used to move wastewater under pressure, typically over terrain that is not conducive to gravity flow. A typical wastewater pump station may house two, three or more pumps. The number and size of the pumps at each station are determined by the amount of wastewater inflow to that site and by amount of storage capacity in a wet well. There is normally no coordination of activity between pumping stations. Pump operations at a given wastewater pump station are typically controlled locally. When the influent in the wet well at a pumping station reaches a certain predetermined level, a sensor triggers the "lead" (or first) pump to start. If the pump's action is not sufficient to handle the inflow of sewage, additional, or "lag" pumps, are called into service. When the wet well level lowers to the desired level, another sensor causes the pump(s) to turn off.

Most wastewater is generated during two or three peak periods of daily activity, mostly in the morning when families are rising for the day and in the early evening when families are returning home from work and school. Throughout the operating day, but especially during these peak periods, it is normal for many stations to pump simultaneously into the same force main since there is no coordination between pumping stations. The more stations that pump at one time, the higher the head pressure in the force main becomes. Pumps cannot pump efficiently when pumping against higher pressures—smaller pumps may not be able to pump at all when more powerful pumps are dominating the force main—causing pumps to run longer in order to accomplish their purpose. This condition results in drastically higher energy costs, increased wear and tear on pumps and mains and a greater likelihood of failures that cause sewage spills. Conversely, there are also many periods during which no pumps are running. When wastewater generation is at the lowest volume, in the middle of the night or, perhaps at mid-morning or mid-afternoon, the majority of pumping stations are frequently dormant.

Wastewater treatment plants are designed and sized one of two ways: either to accommodate estimated daily total inflows, or to serve peak demands on the system. Plants designed to accommodate a daily average inflow run the risk of being incapable of handling those few peak hours of the day when most of the inflow occurs. Those designed to accommodate the peak inflow hours sit idle for most of a twenty-four hour period, since the peak inflows only occur during a few hours of the operational day. Failure to provide sufficient capacity will likely result in pretreatment spills, damage to infrastructure with attending high repair costs and loss of service to customers and damage to customer property. This consequence forces careful sizing to accommodate the long-term estimate of peak loading. The daily capacity of the infrastructure to treat wastewater may be supplemented by surge tanks either in the initial design or as an addition to the existing infrastructure. In either case, the infrastructure and surge tanks are quite costly and add to on-going maintenance costs.

Very frequently, wastewater treatment plants are sized based on estimated daily total inflows and are measured in terms of (millions) of gallons per day. When, over a period of years, population increases exceed long-term plans, the addition of surge tanks to temporarily store the unmanageable inflow is necessary to prevent overflows at the plant's headworks, the point of inflow into the plant. Later, during lower flow times, surge tank contents may be processed through the treatment system. Surge tanks provide temporary storage at the wastewater treatment plant to accommodate the wastewater plant's processing rate, but do not lessen flow into the infrastructure.

Wastewater collection systems have pump stations distributed throughout the service area that arbitrarily pump wastewater to the treatment plants. But these pumps only respond to local conditions and are activated by local level sensors without regard to events or conditions elsewhere. As a result, during peak activity hours, e.g., from 6 AM to 8 AM and from 5 PM to 7 PM, these pump stations operate more frequently, thereby raising the inflow into the plant, frequently surpassing the plant's processing capability. It should be noted that these high inflow periods normally occur between periods during which there is very little, if any, flow into the wastewater treatment plant. The result is normally a need for a higher design margin and/or earlier system expansion.

Another consequence of unmanaged flow is reduced efficiency in managing the biological treatment material at the wastewater treatment plant. The most efficient biomass management requires a relatively constant flow rate so that bacteria used in processing can effectively interact with the influent waste. High or irregular flow rates lessen the efficiency of the treatment system and the quality of the treated effluent.

Sewer mains are frequently sized to take into account future growth in a wastewater collection service area, but it is not unusual for years to pass before the volume of wastewater reaches the level for which the system was designed. During this time, the utility may experience maintenance problems if the volume of wastewater through the main is not sufficient to carry with it solids and silt. If the flow of wastewater is so small relative to the pipe size that it fails to reach a velocity known as 'scour speed', solids will fall out of the liquid and accumulate in the bottom of the sewage mains. When this occurs, expensive specialty vehicles typically known as vacuum trucks are employed to clean out sediment that accumulates in the sewage system.

PROBLEMS OF THE PRIOR ART

Wastewater collection and treatment systems often operate under conditions in which pumps operate inefficiently, causing increased energy cost and wear and tear on costly equipment. Further, peak flows into the treatment plant result in accidental spillages and impede the operational efficiency of the biological treatment processes utilized in the treatment plant. Further, there are times when flow is inadequate to keep the force mains free of sediment, requiring the use of expensive special purpose trucks. In addition, the operational requirements of the various force main sometimes allows small pumps to run at the same time as larger pumps thereby causing the smaller pumps to operate against the higher pressure from the larger pumps resulting in considerable inefficiency in the operation of the smaller pumps. Also, existing systems frequently encounter situations where the wet wells to do not get pumped down sufficiently and they therefore begin to generate septic conditions with the accompanying unpleasant smells.

BRIEF SUMMARY OF THE INVENTION

In accordance with the present invention, these and other problems associated with the operation and maintenance of wastewater collections systems for wastewater treatment plants, are successfully addressed by apparatus and techniques for pump management, wherein the operation of wastewater collection systems is based upon modulating the operation of the pumping stations systematically, rather than allowing pumps to operate independently.

One aspect of the invention employs a Wastewater Collection Flow Management System that incorporates (selectively or collectively) five techniques that improve wastewater collection and treatment operations. These steps include: 1—PUMP MANAGEMENT that provides for increased pump efficiency, which reduces energy costs and wear and tear on costly equipment; 2—FLOW MANAGEMENT for controlling the rate at which wastewater enters the wastewater treatment plant, reducing accidental spillages, diminishing the need for additional construction and improving the efficiency of the biological treatment process; 3—SEDIMENT ELIMINATION for keeping sewage mains free of sediment to maximize flow capability and saving the expense of alternative methods of sewage main cleaning; 4—PRESSURE MANAGEMENT for comprising operating efficiency by allowing small pumps to run only when a larger pump is not running so that the smaller pumps do not pump into a main which has a higher pressure than is optimal for the smaller pumps; and 5—SEPTIC ELIMINATION for ensuring that wet wells get pumped down enough that septic conditions do not occur or are minimized. These steps are combined to drastically reduce a water utility's energy expenditures, reduce maintenance and repair costs and reduce the need and expense of special equipment and additional infrastructure construction.

The invention is designed to overcome the problems of the prior art as indicated below.

One embodiment of the invention is directed to a method of operating a plurality of pump stations feeding a wastewater treatment facility. The method may include the step of controlling the operation of pump stations in a systematic fashion from a central location.

The step of controlling the operation of pump stations in a systematic fashion comprises may include activating pumps at pump stations on a force main in an order of priority based on capacity of a wet wells and intake volumes at the pump stations.

The step of controlling the operation of pump stations in a systematic fashion may alternately comprises activating pumps at pump stations on a force main in order of distance from a treatment facility from farthest to nearest.

The wet wells of pumps on a force main may be pumped down prior to the start of a peak flow period.

The step of controlling the operation of pump stations in a systematic fashion may comprises the steps of allowing the wet wells of one or more pump stations to fill to a secondary lead level, and activating a sufficient number of pumps at one or more pump stations to pump down the wet wells at a rate sufficient to cause flow in the force main to exceed a scour speed for the force main, to thereby flush the force main.

The step of controlling the operation of pump stations in a systematic fashion may also comprises the steps of notifying the central location from each pump station of the status of the wet well and the identity of any pumps running, receiving a command from the central location, if any relatively small pump is running on a force main, to increase the threshold level of activation for wet wells associated with relatively larger pumps on that force main: and info relatively smaller pumps are operating, receiving a command from the central location to activate larger pumps at full pressure output, so that no relatively smaller pumps are operating on a force main at the same time that a larger pump is running on that force main.

The step of controlling the operation of pump stations in a systematic fashion may still further comprises the steps of; identifying pump stations on a force main that do not pump wet wells at said pump station down to the lowest level at least twice a day; and, for each pump station identified, activate one or more pumps twice a day to reduce levels in the wet wells to a point where septic conditions are minimized.

The invention is also directed to a wastewater treatment system comprising a wastewater treatment facility, a plurality of force mains connecting a plurality of pump stations, each having a wet well, to said wastewater treatment facility, a plurality of communication transceivers at a corresponding plurality of pump stations for notifying a central station of information about the operation of a pump station, and a central communication station for receiving information from said plurality of transceivers and for sending information to said transceivers to control the operation of the pump stations in a systematic fashion.

The system may also include information for activating pumps at pump stations on a force main in an order of priority based on capacity of a wet wells and intake volumes at said pump stations.

The information sent to the transceivers to control the operation of pump stations in a systematic fashion may comprise information for activating pumps at pump stations on a force main in order of distance from a treatment facility from farthest to nearest.

The information sent may causes wet wells of pumps on a force main to be pumped down prior to the start of a peak flow period.

The information sent to the transceivers to control the operation of pump stations in a systematic fashion may comprises information causing the wet wells of one or more pump stations to fill to a secondary lead level, and information for activating a sufficient number of pumps at one or more pump stations to pump down the wet wells at a rate sufficient to cause flow in the force main to exceed a scour speed for the force main, to thereby flush the force main.

The transceivers of each pump station may notify the central location of the status of the wet well and the identity of any pumps running, and the central location sends information to said transceivers, if any relatively small pump is running on a force main, to increase the threshold level of activation for wet wells associated with relatively larger pumps on that force main and if no relatively smaller pumps are operating sending information to activate larger pumps at full pressure output, so that no relatively smaller pumps are operating on a force main at the same time that a larger pump is running on that force main.

The information sent to the transceivers to control the operation of pump stations in a systematic fashion may comprise the steps of identifying at a central location, using information received from said transceivers, pump stations on a force main that do not pump wet wells at said pump station down to the lowest level at least twice a day and, for each pump station identified, activating one or more pumps twice a day to reduce levels in the wet wells to a point where septic conditions are minimized.

The invention may further include a method of reducing energy used in operation of a wastewater treatment plant. The method may include the steps of pumping down wet wells of pump stations on a force main prior to the beginning of a peak flow period.

The step of pumping down wet wells of pump stations on a force main prior to the beginning of a peak flow period may include activating pumps at pump stations on a force main in order of distance from a treatment facility from farthest to nearest.

The invention may still further include a method of reducing maintenance requirement on pumps of a pump station having transceivers on it force main feeding a wastewater treatment facility. The method may comprise the steps of causing transceivers of each pump station to notify a central location of the status of the wet well and the identity of any pumps running, and causing the central location to send information to said transceivers, if any relatively small pump is running on a force main, to increase the threshold level of activation for wet wells associated with relatively larger pumps on that force main and if no relatively smaller pumps are operating sending information to activate larger pumps at full pressure output, so that no relatively smaller pumps are operating on a force main at the same time that a larger pump is running on that force main.

The invention may still further include a computer program product comprising: a computer readable memory medium, computer controlling instructions stored on the computer readable memory medium. The instructions may include instructions for controlling the operation of pump stations on one or more force mains of a wastewater treatment facility in a systematic fashion.

The computer controlling instructions stored on the computer readable memory medium may further comprise instructions for pumping down the wet wells of pumps on a force main prior to the start of a peak flow period for that force main.

The computer controlling instructions stored on the computer readable memory medium may further comprise instructions for notifying the central location from each pump station of the status of the wet well and the identity of any pumps running, receiving a command from the central location, if any relatively small pump is running on a force main, to increase the threshold level of activation for wet wells associated with relatively larger pumps on that force main; and info relatively smaller pumps are operating, receiving a command from the central location to activate larger pumps at full pressure output, so that no relatively smaller pumps are operating on a force main at the same time that a larger pump is running on that force main.

DETAILED DESCRIPTION OF THE INVENTION

Figure 1:
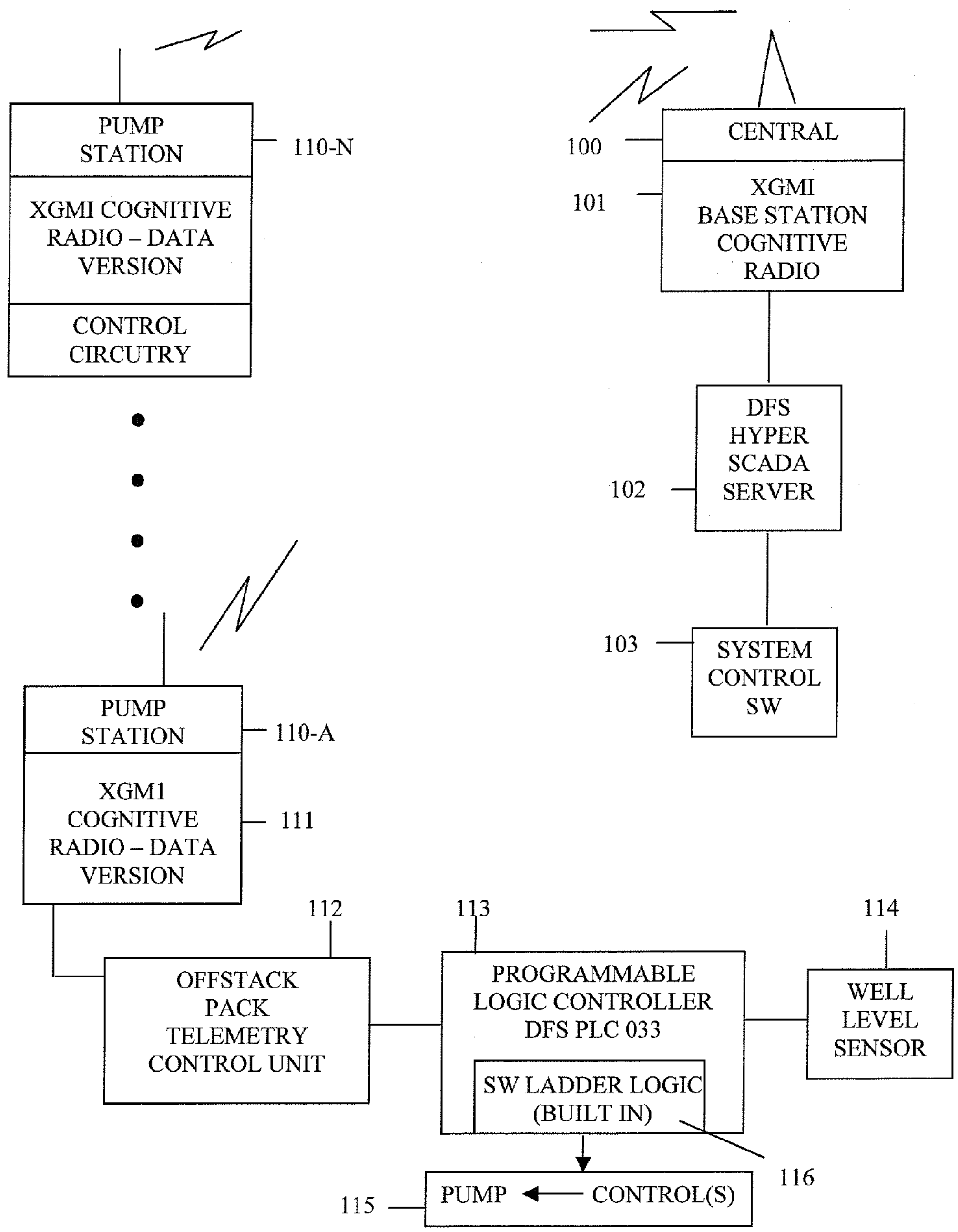
FIG. 1 is a block diagram illustrating how a plurality of pump stations communicate with a central server in a wastewater treatment system in accordance with one aspect of the invention.

FIG. 1 is a block diagram illustrating how a plurality of pump stations communicate with a central server in a wastewater treatment system in accordance with one aspect of the invention. A central station 100 includes a base station 101, preferably including an XGMI Cognitive Radio for communicating with remotely located pump stations. Commands are sent to the pump stations over the base station radio and are generated by a server process running, preferably, on a DFS hyper SCADA server 102. The server is controlled by system control software 103 described more hereinafter A plurality of stations 110-A through 110-N communicate with the central base station using, preferably, radio links. Almost any type of communication link is possible when designing a system to utilize the benefits of the disclosed invention. These can include microwave, optical (e.g. laser), wireline, optical fiber, microwave communication links and the like. Preferably, however, radio communication links are used in this invention. Each pump station 110-A through 110-N is equipped with an XGM1 Cognitive Radio 111 (data version) for transmitting and receiving information from the central.

The radio 111 interfaces to a programmable logic controller 113 utilizing telemetry control unit 112. Preferably, telemetry control unit is a Data Flow System TAC Pack and the programmable logic controller is a Data Flow System PLC 033. A plurality of well level sensors 114 are located within the wet well and provide information to the programmable logic controller 113 which includes ladder logic functionality to determine which pump should be activated, depending upon the level of liquid within the wet welL The ladder logic then activates the appropriate pumps using respective pump control circuitry, such as relays as illustrated, for example, in block 115.

Figure 2A:
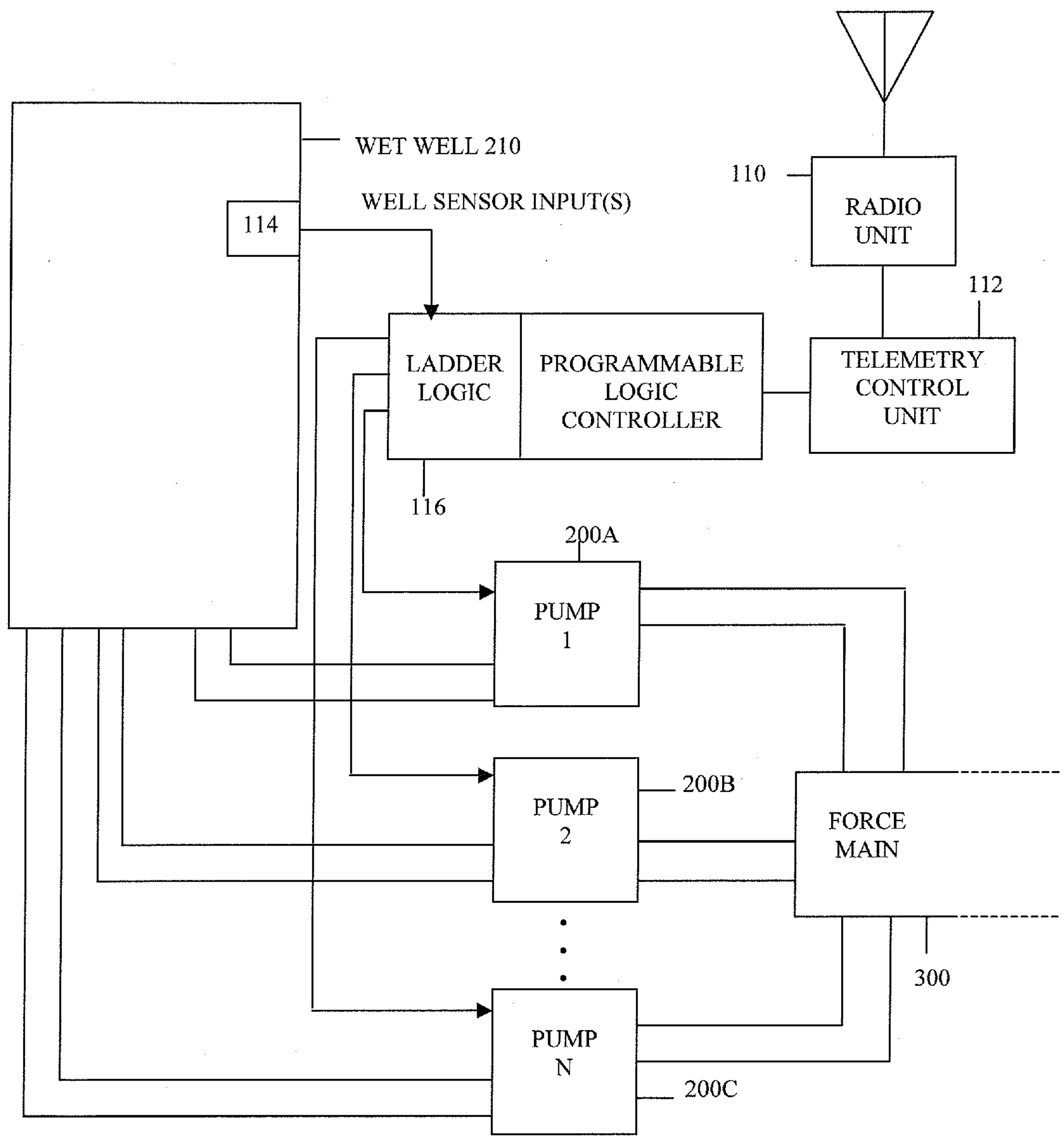
FIG. 2A is a block diagram of an exemplary pump station in accordance with one aspect of the invention.

FIG. 2A is a block diagram of an exemplary pump station in accordance with one aspect of the invention. A plurality of pumps 200A through 200C serve to empty a wet well 210 depending upon the level determined by the well sensor inputs 114. The well sensor inputs feed ladder logic 116 which then determine which pumps to activate, depending upon the levels sensed by the sensors and upon information received from the central via radio unit 110, telemetry control unit 112 and programmable logic 113. When one or more pumps are turned on, the liquid in the wet well is pumped through pipes into the force main 300 to begin its travel to the wastewater treatment plant.

Figure 2B:
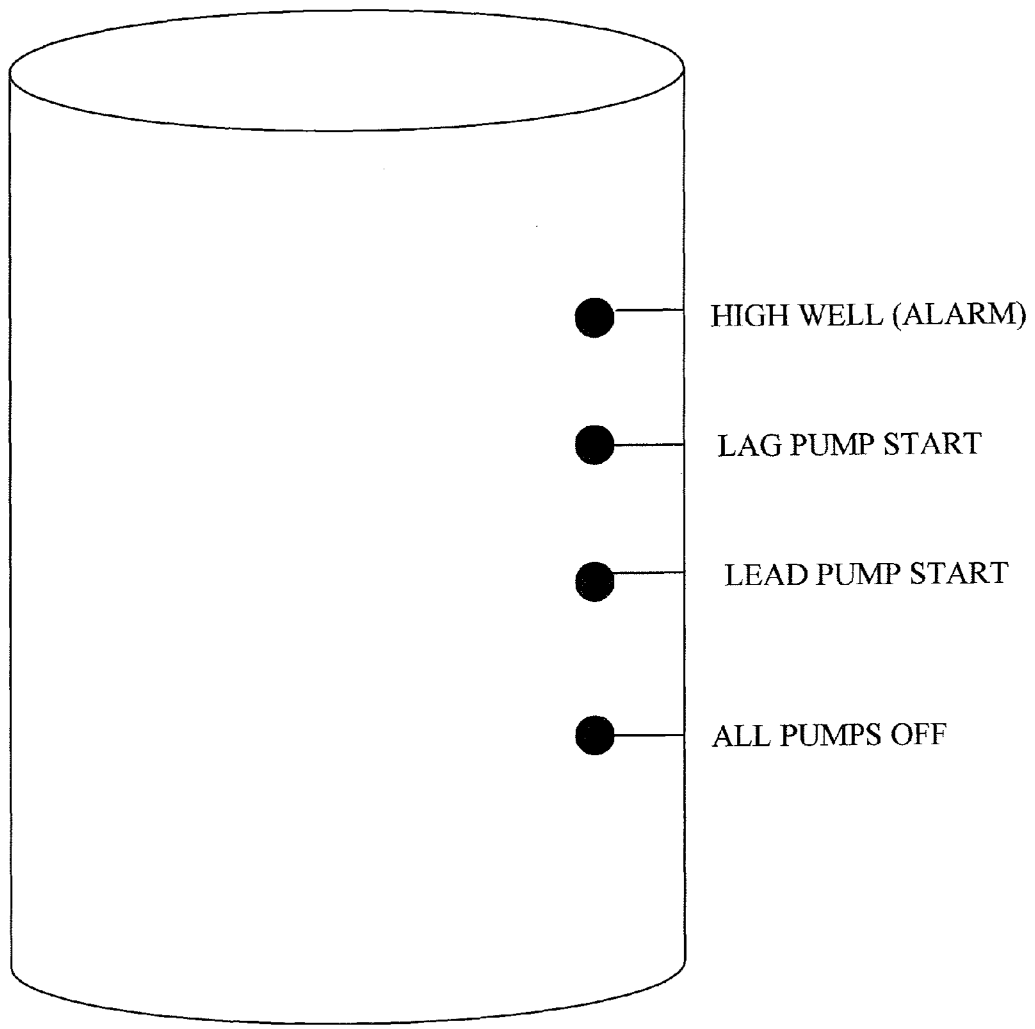
FIG. 2B is a diagram showing a typical level sensor arrangements in a wet well as used in the prior art.

FIG. 2B is a diagram showing a typical level sensor arrangement in a wet well as used in the prior art. As show in FIG. 2B there are four sensors. From bottom to top, the first is a sensor indicating that the liquid is at an appropriate level and all pumps are turned off. The second causes the lead pump start to be triggered when the liquid in the well rises to the level indicated. It is the level at which the first pump begins to pump into the force main. Yet higher up the wet well is a lag pump start which is utilized to activate one or more additional pumps when the level reaches that sensor. Finally, there is a high well (alarm) sensor which indicates that over flow is threatened and appropriate action should be taken.

Figure 2C:
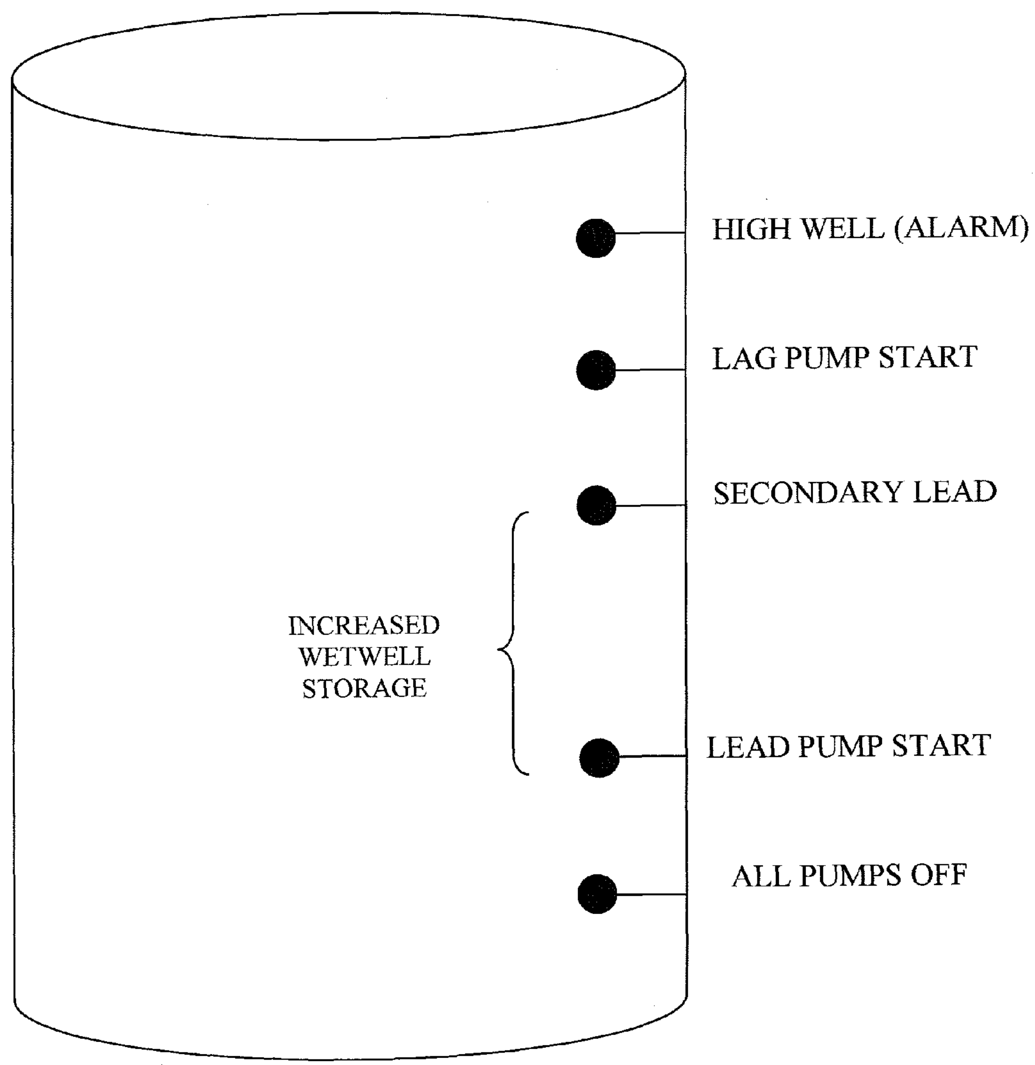
FIG. 2C is a diagram showing a level sensor arrangement in a wet well in accordance with one aspect of the invention.

FIG. 2C is a diagram showing a level sensor arrangement in a wet well as used in accordance with one aspect of the invention. In addition to the sensor levels described in conjunction with FIG. 2B, there is a secondary lead level which is utilized as described more hereinafter.

Figure 3:
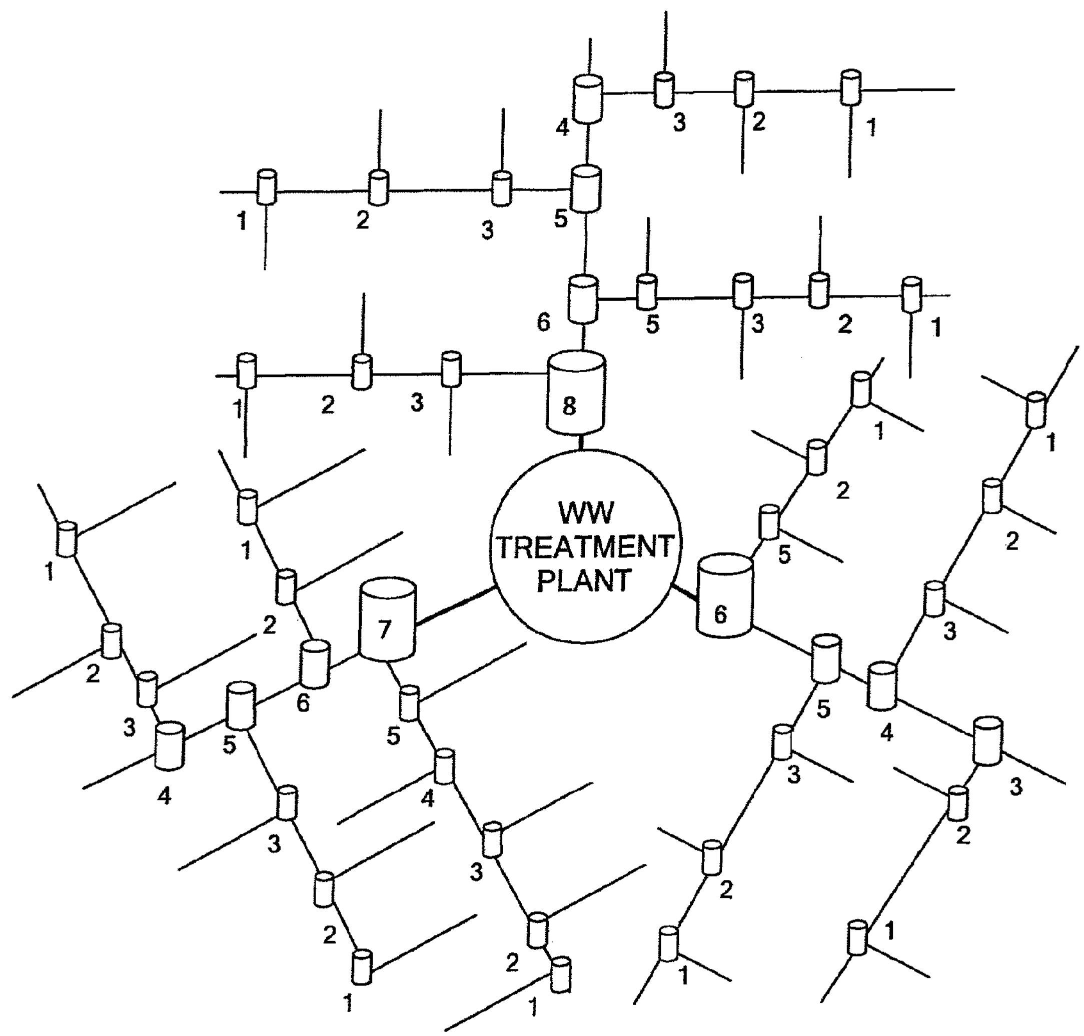
FIG. 3 illustrates an example of how a plurality of pump stations are interconnected to a wastewater treatment plant using force mains.

FIG. 3 illustrates an example of how a plurality of pump stations 1, 2, 3, 4, 5, 6, 7, 8 is interconnected to a wastewater treatment plant using force mains. The size of the individual symbol utilized for the pump stations 1, 2, 3, 4, 5, 6, 7, 8 shown feeding the wastewater treatment plant is indicative of the relative capacity of the wet well and the pumps associated with the pump station. The numerals associated with the various pump stations 1, 2, 3, 4, 5, 6, 7, 8 are used in later discussions of the invention.

Figure 4:
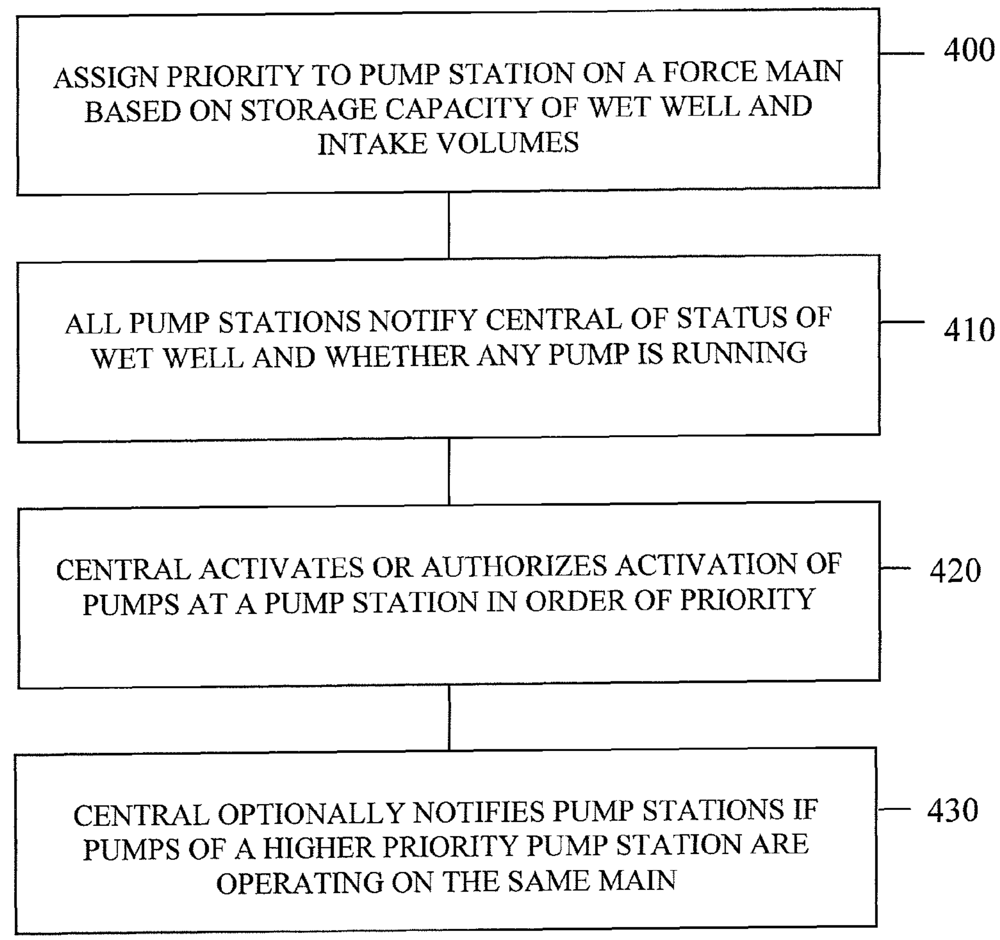
FIG. 4 is a flow chart of a pump management process using pump priorities in accordance with one aspect of the invention.

FIG. 4 is a flow chart of a pump management process using pump priorities in accordance with one aspect of the invention. As shown in FIG. 4, a priority is assigned to each pump station on a main based on the storage capacity of the wet well and intake volumes (400). All pump stations notify the central station of the status of the wet well and whether any pump is running (410). The central activates or authorizes activation of pumps at a pump station in order of pump station priority (420). Finally, the central station optionally notifies pump stations if pumps of a higher priority pump station are operating on the same main (430).

This first, PUMP MANAGEMENT aspect of the invention synchronizes the operations of remote wastewater pumping stations that feed a common pressurized sewage main (force main). The goals of PUMP MANAGEMENT are to eliminate conditions during which multiple pump stations need to pump simultaneously and to reduce the periods during which no pump is running. PUMP MANAGEMENT provides a mechanism by which busier pump stations, those that historically have either a higher rate of influent or a comparatively smaller storage capacity and tend to have a more critical need to pump, are given priority over those with a lower demand. This priority-based PUMP MANAGEMENT control mechanism tends to minimize the immediate peak flow level in the wastewater collection system since pump stations with a lesser need for immediate pumping are delayed until higher priority pumps have completed their pumping cycles. As the higher-priority pump stations' demand diminishes, other stations are enabled to operate their pumps, according to their descending priority.

Since pumping stations normally operate independently, using local wet well level sensors to trigger pumps when wet wells reach a prescribed level, it is not unusual for many of the pumping stations to pump simultaneously into a common force main during high usage periods. When this occurs, pumps must work against increased head pressure in the force main. The result is that more powerful pumps must pump longer in order to overcome the head pressure and complete their tasks of emptying their respective wet wells. Smaller pumps frequently spin uselessly, since they are unable to generate enough power to overcome the head pressure encountered during high usage periods. (Also, during low usage hours, it is not unusual for no pumps using a common main to pump, leaving the force main and the system idle.) This condition causes two main problems. First, it greatly increases the already very high energy cost associated with operating a wastewater collection system, which is frequently the highest ongoing budget item absorbed by water utilities. Second, this ineffective mode of operation causes pumps to run longer and against more resistance, resulting in greatly increased maintenance and repair costs associated with maintaining wastewater pumping stations.

The object of PUMP MANAGEMENT is to reduce the number of pumps operating simultaneously, resulting in more efficient, lower cost operations, and to better utilize the pumping system during those quiet hours when no pumps are running. The control mechanism utilizes a remote monitoring and control system called a supervisory control and data acquisition (SCADA) system. Pumping stations are prioritized using historical and physical data regarding the sites. An additional wet well level criterion, 'Secondary Lead' is added to the typical level indications, which are normally, 'Off', 'Lead (pump)', 'Lag (secondary pump)', and 'High Level' alarm (FIG. 1). The 'Lead' sensor position is lowered close to the 'Off' position and the new, 'Secondary Lead' sensor is positioned higher in the wet well, but not higher than the 'Lag' position, to allow for additional storage in the wet well before a pump is called to run (FIG. 2C).

Each local pump control system includes an output to the SCADA system that indicates if any pump is running. In addition, each pump control includes an input point that allows the central SCADA software to inform the site if a higher priority site is pumping.

In operation, when a pump station wet well reaches its normal 'lead pump on' level, the site is only permitted to begin pumping if no higher priority site is currently pumping. The pump station remains dormant until either no higher priority pump along the force main is running or until the secondary lead level is reached in the wet well. At that point, the site is permitted to pump even if a higher priority site is pumping in order to avoid an overflow/spill. If the SCADA system signals the pump station that no higher priority site is operating, the pump station is permitted to operate normally, using the regular 'lead' pump level, and the secondary lead sensor is ignored.

This system substantially eliminates periods during which more than one pump is running. Pumps do not have to work against high head pressures. As a result, the pumps operate more efficiently, using less power and completing their tasks more quickly. In addition, since the system causes the pump station operations to spread out in time, the lower priority pump sites begin to run more frequently during the low usage hours.

Figure 5:
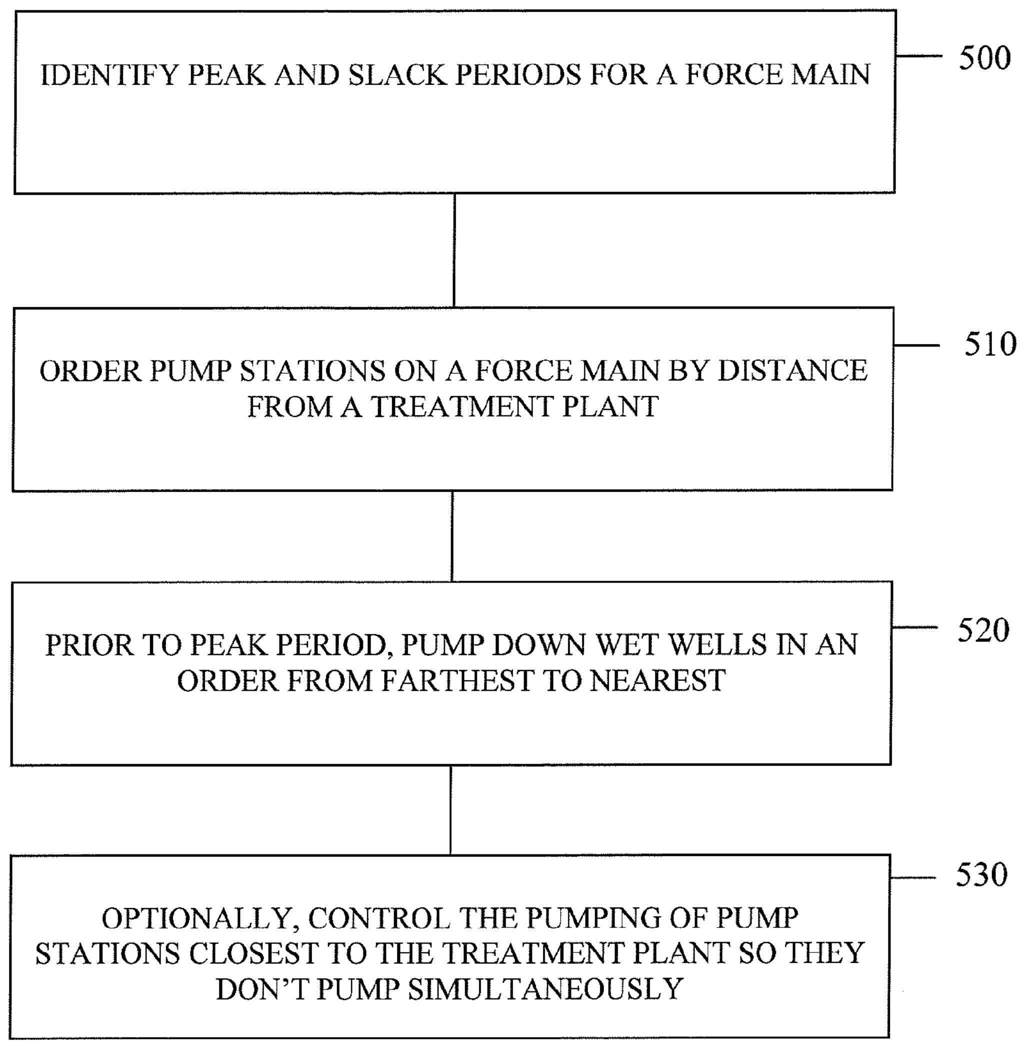
FIG. 5 is a flow chart of a flow management process in accordance with one aspect of the invention.

FIG. 5 is a flow chart of a flow management process in accordance with one aspect of the invention. The peak and slack periods for flow on a force main are identified at block 500. Typically, the peak and flow periods are associated with certain times of the day. For example, one would expect a peak flow period in the morning as people arise from the night and prepare themselves for the day. Water usage and waste flow increase at those times, because people tend to follow the same daily cycle of activities.

The pump stations on a particular force main are ordered by distance from a treatment plant (510) as illustrated, for example, with the numbers shown in FIG. 3. As shown in FIG. 3, the pumps are assigned numbers starting from the outermost pump station on a force main and increasing along the force main toward the wastewater treatment plant.

Prior to a peak period of usage, the pump stations are ordered to pump down the wet well in an order that begins from the farthest to the nearest as illustrated, for example, at block 520. This means that when a peak period begins, each of the wet wells of the pump stations have been substantially emptied to the extent needed to absorb an increase of flow beyond the capacity of the pump stations to handle currently.

Optionally, control of the pumping of the pump stations closest to the treatment plant may be arranged so that they don't pump simultaneously (block 530) at full force which might overload the ability of the treatment plant to process the flow.

Figure 6A:
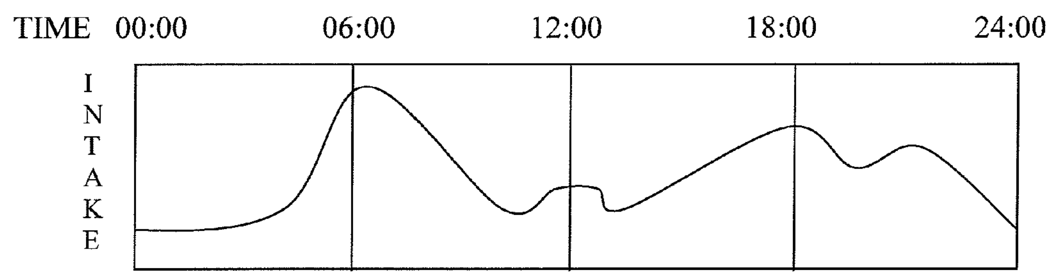
FIG. 6A illustrates flow volumes as a function of time of day without the use of the flow management aspects of the invention.

FIG. 6A illustrates flow volumes as a function of time of day without the use of flow management described in conjunction with FIG. 5.

Figure 6B:
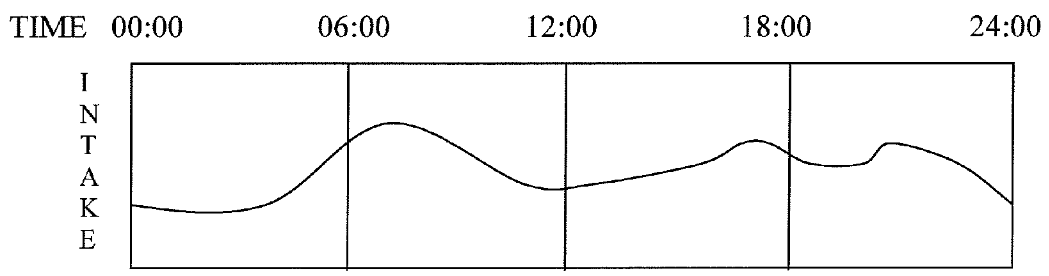
FIG. 6B illustrates flow volumes as a function of time of day with the use of the flow management aspects of the invention.

FIG. 6B illustrates flow volumes as a function of time of day with the use of flow management in accordance with the invention. One can see that the peak flows of FIG. 6B are much less than the peak flows of FIG. 6A. One can also see that the minimums of flow occur at a higher level than occur in FIG. 6A. The results from pumping down the wet wells prior to the peak period, results in lower peak usage but the excess flow that would have been handled at a peak time is averaged over other periods.

Figure 7:
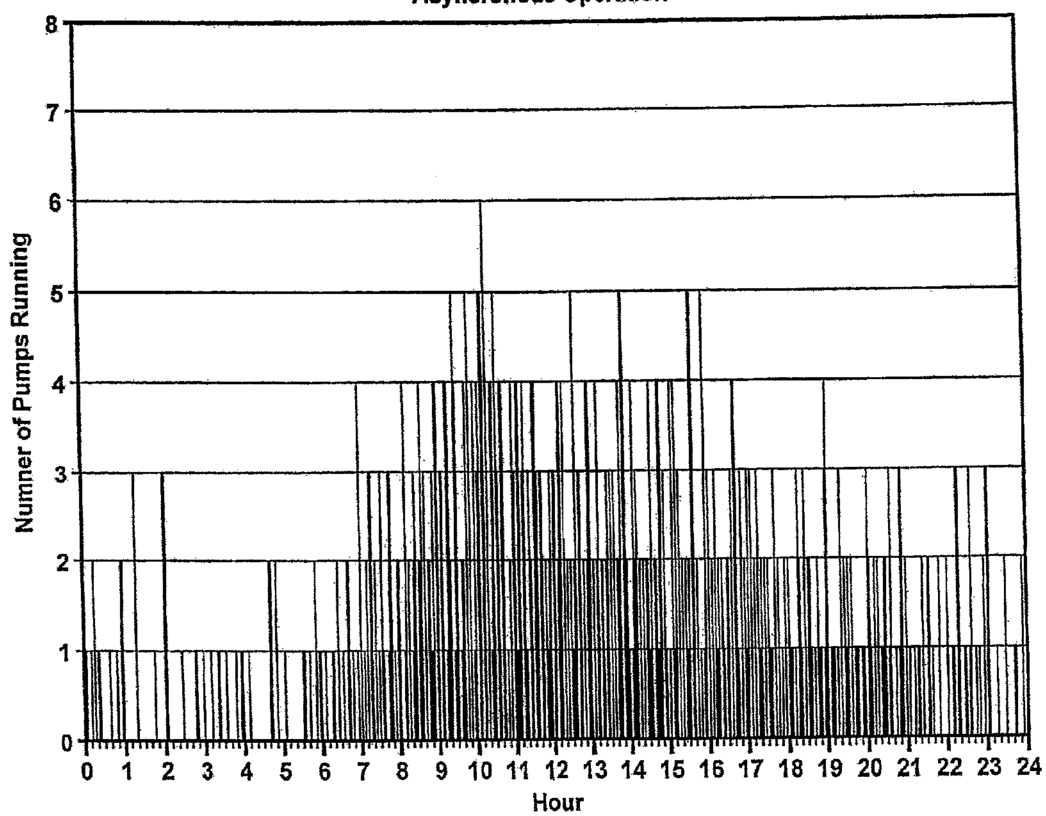
FIG. 7 is a graph showing the number of pumps running as a function of time of day without flow management.

FIG. 7 is a graph showing the number of pumps running as a function of time of day without flow management. In this figure, the peak number of pumps running is 6 with 9 periods occurring during the day during which five pumps or more are simultaneously running.

Figure 8:
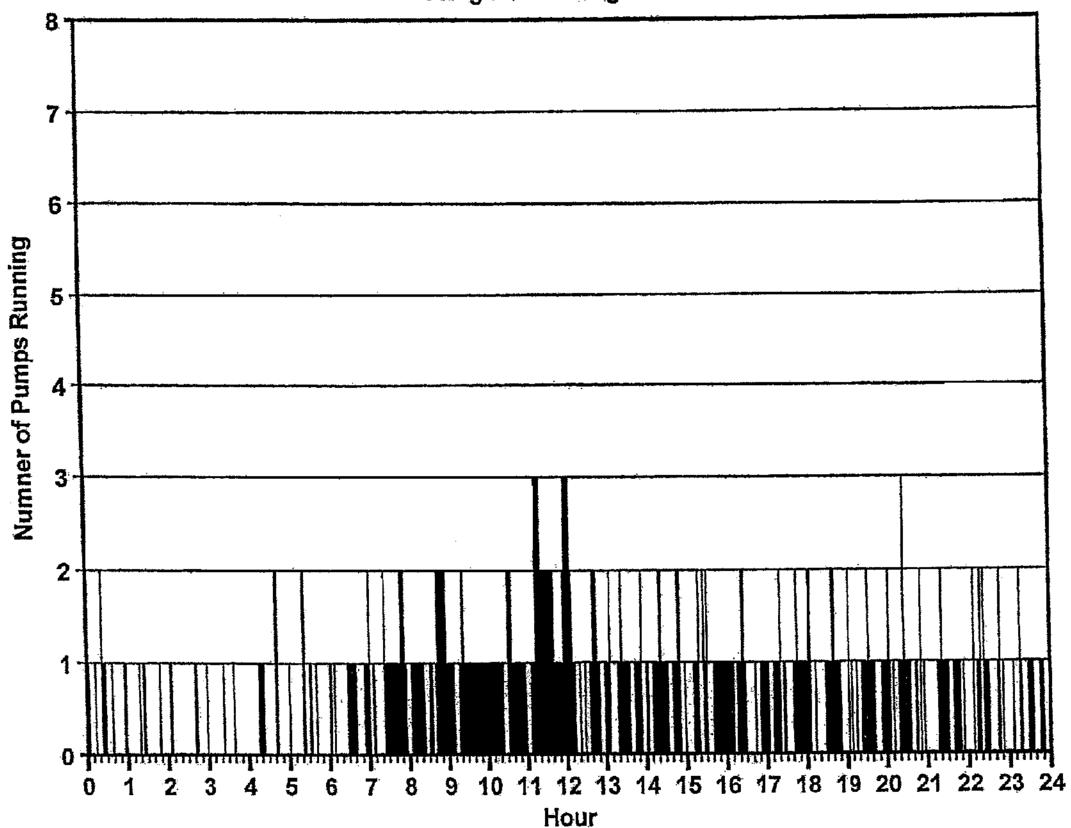
FIG. 8 is a graph showing the number of pumps running as a function of time of day using flow management in accordance with one aspect of the invention.

FIG. 8 is a graph showing the number of pumps running as a function of time of day using flow management in accordance with one aspect of the invention. With flow management in place, the peak number of pumps running at any point in time is 3, rather than 6 when flow management in accordance with the invention was not utilized. Further, during those periods in which only one pump was running, one can see from the substantially black areas, that there are periods during which there are very few intervals during which no pump is running. Thus, there are many fewer intervals during which more than one pump is running and there are fewer intervals during which no pumps are running. Note also that the peak time intervals are somewhat shifted in the graph of FIG. 8 from the peak time interval shown in FIG. 7. This can be accounted for by the fact that the emptied wet wells have more time to fill before a pump is required to move their contents.

Figure 9:
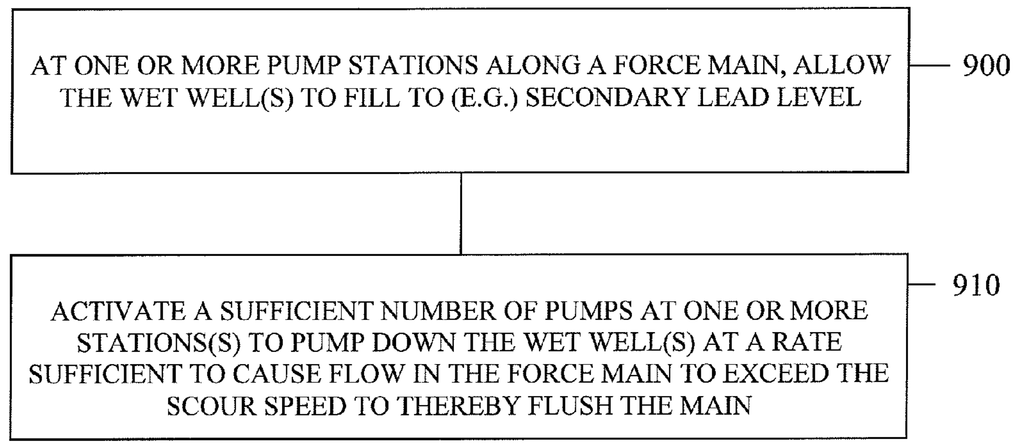
FIG. 9 is a flow chart of a process for sediment elimination in accordance with one aspect of the invention.

FIG. 9 is a flow chart of a process for sediment elimination in accordance with one aspect of the invention. In this case, at one or more pump stations along a force main, one allows the wet wells to fill to, in this example, a secondary lead level (900).

When the wet well is filled to the secondary lead level, one activates a sufficient number of pumps at one or more pump stations to pump down the wet wells at a rate sufficient to cause flow in the force main to exceed the scour speed and to therefore flush the main (910). In this manner, sediment occurring along a force main can be flushed out without the intervention of a vacuum truck or other external mechanism.

Figure 10:
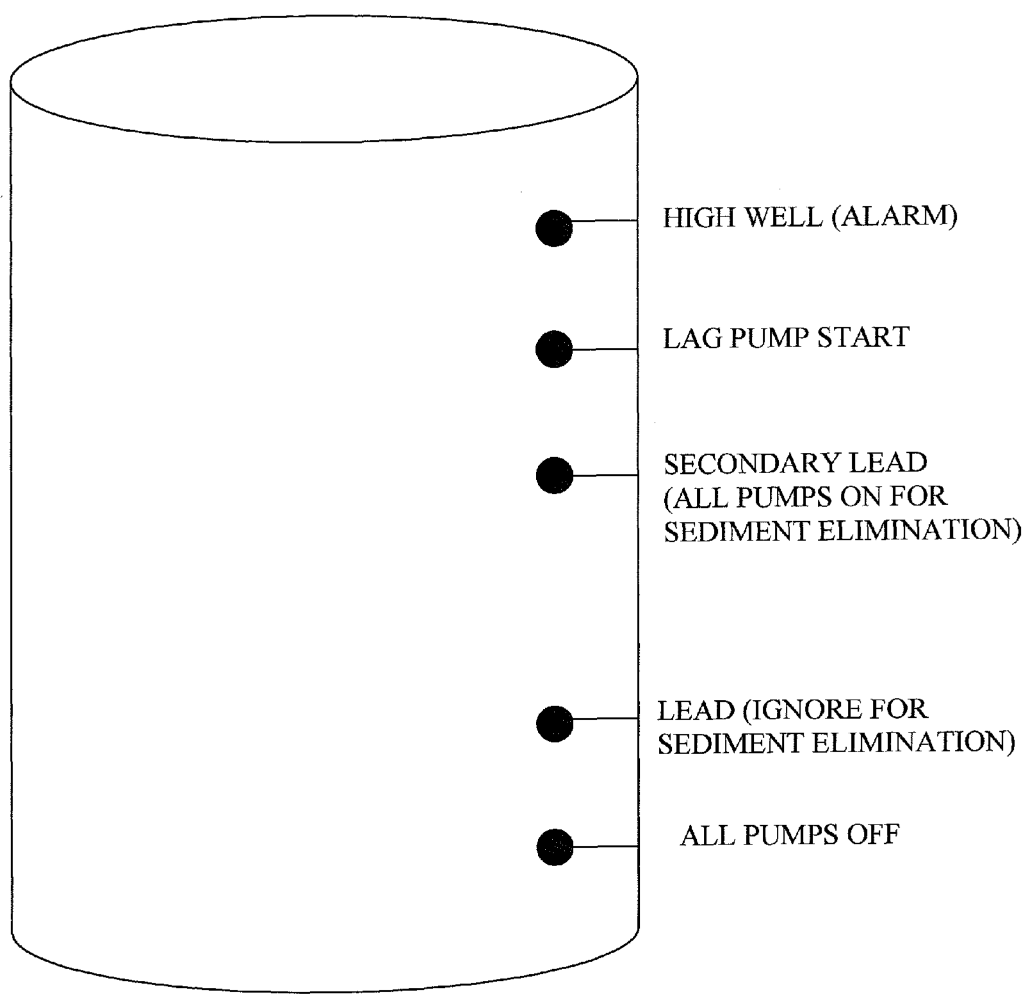
FIG. 10 is a diagram of a wet well in accordance with one aspect of the invention showing use of secondary lead level detection for sediment elimination.

FIG. 10 is a diagram of a wet well in accordance with one aspect of the invention showing use of secondary lead level detection for sediment elimination. As noted above, when the secondary lead level is reached, pumps will be turned on to produce a flow which will result in a sufficient flow to flush sediment from the main.

Figure 11:
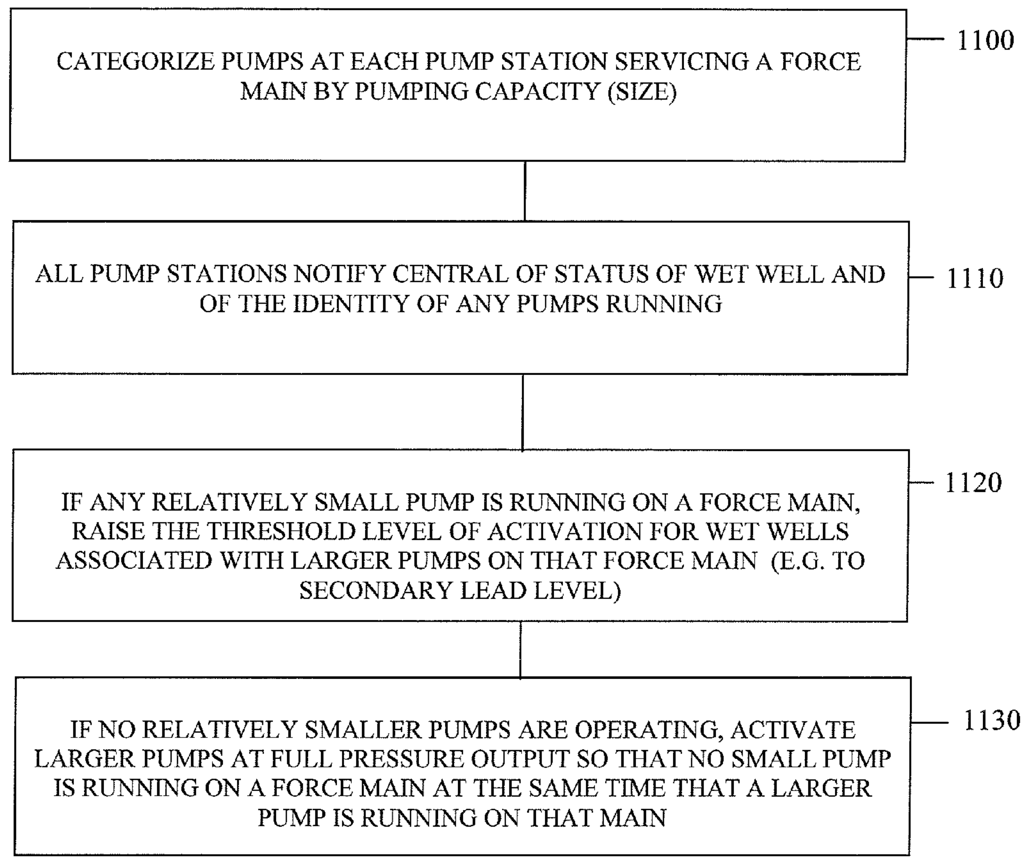
FIG. 11 is a flow chart of a process for pressure management in accordance with one aspect of the invention.

FIG. 11 is a flow chart of a process for pressure management in accordance with one aspect of the invention. In this approach, pumps at each pump station servicing a particular force main are characterized by pumping capacity (size) (1100). All pump stations notify the central station of the status of their wet well and of the identity of any pumps running (1110). If any relatively small pump is running on a force main, the central will order the threshold level of activation for wet wells associated with larger pumps on that force main to rise (e.g. to a secondary lead level) (1120) so they do not activate and adversely affect the pumping efficiency of the relatively small pump.

If no relatively smaller pumps are operating, the central can activate the larger pumps to operate at full pressure output. In this way, relatively small pumps may not attempt to operate during periods when the larger pumps are operating at full pressure output, which would negate the capabilities of the smaller pumps to efficiently transfer fluid to the force main (see block 1130).

Figure 12:
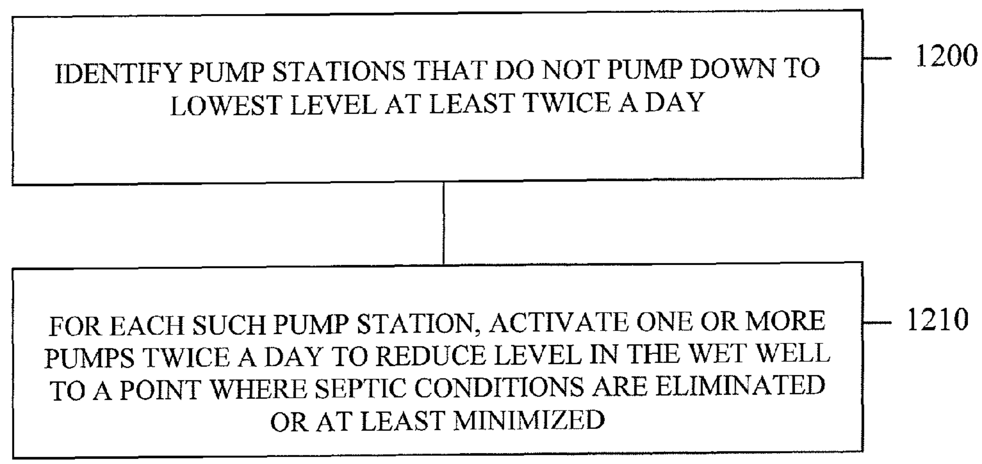
FIG. 12 is a flow chart of a process for septic elimination in accordance with one aspect of the invention.

FIG. 12 is a flow chart of a process for septic elimination in accordance with one aspect of the invention. To avoid septic conditions, pump stations that do not pump down to the lowest level of a wet well at least twice a day are identified (see block 1200). For each such pump station, one or more pumps at that pump station will be activated twice a day to reduce the level in the wet well to a point where septic conditions are eliminated or at least minimized (see block 1210). This technique is particularly useful when a large force main has been installed to accommodate planned future development, but the current needs utilize only a small portion of the capacity While various embodiments of the present invention have been illustrated herein in detail, it should be apparent that modifications and adaptations to those embodiments may occur to those skilled in the art without departing from the scope of the present invention as set forth in the following claims.

The invention claimed is:

1. A method of operating a plurality of pump stations feeding a wastewater treatment facility, each of the plurality of pump stations positioned exterior to the wastewater treatment facility so as to move wastewater from a position exterior to the wastewater treatment facility to a position interior to the wastewater treatment facility for treatment, the method comprising the step of controlling operation of the plurality of pump stations in a systematic fashion from a central location by activating pumps at the plurality of pump stations on a force main in an order of priority based on capacity of wet wells and intake volumes at the plurality of pump stations by manipulating a threshold level of activation for the wet wells;

wherein the step of controlling the operation of pump stations in a systematic fashion includes causing the wet wells of one or more pump stations to fill to a secondary lead level, activating a sufficient number of pumps at one or more pump stations to pump down the wet wells, notifying the central location from each pump station of a status of the wet well and identifying of any pumps running, receiving a command from the central location if any relatively small pump is running on a force main to increase the threshold level of activation for wet wells associated with relatively larger pumps on that force main, and, if no relatively smaller pumps are operating, receiving a command from the central location to activate larger pumps at full pressure output by manipulating the threshold level of activation for the wet wells so that no relatively smaller pumps are operating on a force main at the same time that a larger pump is running on that force main.

2. The method of claim 1 in which the step of controlling the operation of pump stations in a systematic fashion comprises the steps of:

a. identifying pump stations on a force main that do not pump wet wells at said pump station down to a lowest level at least twice a day; and b. for each pump station identified, activating one or more pumps by manipulating the threshold level of activation for the wet wells twice a day to reduce levels in the wet wells to a point where septic conditions are minimized.

3. A wastewater treatment system comprising:

a. a wastewater treatment facility;

b. a plurality of force mains connecting a plurality of pump stations, each having a wet well, to said wastewater treatment facility, each of the plurality of pump stations positioned exterior to the wastewater treatment facility so as to move wastewater from a position exterior to the wastewater treatment facility to a position interior to the wastewater treatment facility for treatment;

c. a plurality of communication transceivers at a corresponding plurality of pump stations for notifying a central station of information about operation of a pump station;

d. a central communication station for receiving information from said plurality of transceivers and for sending information to said transceivers to control operation of the pump stations in a systematic fashion by activating the plurality of pumps at the plurality of pump stations in an order of priority based on capacity of the wet wells and intake volumes at the plurality of pump stations by manipulating a threshold level of activation for the wet wells;

e. wherein the information sent to the transceivers to control the operation of pump stations in a systematic fashion includes information causing the wet wells of one or more pump stations to fill to a secondary lead level, and information for activating a sufficient number of pumps at one or more pump stations to pump down the wet wells at a rate sufficient to cause flow in the force main to exceed a scour speed for the force main, to thereby flush the force main by manipulating the threshold level of activation for the wet wells.

4. The system of claim 3 in which the information sent to the transceivers to control operation of the pump stations in a systematic fashion comprises information for activating the pumps at each of the pump stations on the force main in order of distance from the wastewater treatment facility from farthest to nearest by manipulating the threshold level of activation for the wet wells.

5. The system of claim 4 in which the information sent causes the wet wells to be pumped down prior to starting of a peak flow period.

6. The system of claim 3 in which the transceivers of each pump station notify the central location of a status of the wet well and identify any pumps running, and the central communication station sends information to said transceivers, so that if any relatively small pump is running on a force main, to increase the threshold level of activation for wet wells associated with relatively larger pumps on that force main and if no relatively smaller pumps are operating send information to activate larger pumps at full pressure output by manipulating the threshold level of activation for the wet wells, so that no relatively smaller pumps are operating on a force main at the same time that a larger pump is running on that force main.

7. The system of claim 3 wherein control of the operation of the plurality of pump stations in a systematic fashion responsive to the information comprises the steps of:

a. identifying the pump stations on the force mains that do not pump wet wells down to a lowest level at least twice a day using the information received from said transceivers; and b. for each pump station identified, activating one or more pumps twice a day to reduce levels in the wet wells to a point where septic conditions are minimized by manipulating the threshold level of activation for the wet wells.

8. A method of reducing energy used in operation of a wastewater treatment facility, comprising the steps of:

pumping down wet wells of pump stations on a force main prior to beginning of a peak flow period and after the peak flow period by manipulating a threshold level of activation for the wet wells: wherein a period of time during which the wet wells are pumped down before the peak flow period and a period of time during which the wet wells are pumped a flow rate down after the peak flow period have a collective length of time sufficient to lower a flow rate of the wastewater within the wastewater treatment system during the peak flow period to a flow rate that is equal to or less than an average flow rate; wherein the wet wells are positioned exterior to the wastewater treatment facility so as to move wastewater from a position exterior to the wastewater treatment facility to a position interior to the wastewater treatment facility for treatment.

9. The method of claim 8 in which the step of pumping down wet wells of the pump stations on the force main prior to a beginning of a peak flow period comprises activating pumps at the pump stations on the force main in order of distance from the wastewater treatment facility from farthest to nearest by manipulating the threshold level of activation for the wet wells.

10. A method of reducing maintenance requirement on pumps of a pump station having transceivers on a force main feeding a wastewater treatment facility, wherein the pump station is positioned exterior to the wastewater treatment facility so as to move wastewater from a position exterior to the wastewater treatment facility to a position interior to the wastewater treatment facility for treatment, the method comprising the steps of:

a. causing a transceiver of the pump station to notify a central location of a status of a wet well and identify any pumps running, and b. causing the central location to send information to said transceiver, if any relatively small pump is running on the force main, to increase a threshold level of activation for the wet well associated with relatively larger pumps on the force main and, if no relatively smaller pumps are operating, sending information to activate larger pumps at full pressure output by manipulating the threshold level of activation for the wet wells, so that no relatively smaller pumps are operating on the force main at the same time that a larger pump is running on the force main.

11. A computer program product comprising:

a. a computer readable memory medium; and b. computer controlling instructions stored on said computer readable memory medium, said computer controlling instructions comprising instructions for controlling an operation of pump stations on one or more force mains of a wastewater treatment facility in a systematic fashion, wherein the pump station is positioned exterior to the wastewater treatment facility so as to move wastewater from a position exterior to the wastewater treatment facility to a position interior to the wastewater treatment facility for treatment, wherein the computer controlling instructions include instructions for pumping down wet wells prior to starting of a peak flow period and after the peak flow period by manipulating a threshold level of activation for the pump stations and for lowering a flow rate of the wastewater within the wastewater treatment system during the peak flow period to a flow rate that is equal to or less than an average flow rate by manipulating a threshold level of activation for the pump stations for a period of time during which the wet wells are pumped down before the peak flow period and for a period of time during which the wet wells are pumped down after the peak flow.

12. The computer program product of claim 11 in which said computer controlling instructions stored on said computer readable memory medium further comprise instructions for a. notifying a central location from each pump station of a status of the wet well and identifying of any pumps running, b. receiving a command from the central location, if any relatively small pump is running on a force main, to increase the threshold level of activation for the wet wells associated with relatively larger pumps on that force main; and c. if no relatively smaller pumps are operating, receiving a command from the central location to activate larger pumps at full pressure output by manipulating the threshold level of activation for the wet wells, so that no relatively smaller pumps are operating on the force main at the same time that a larger pump is running on that force main.

13. A method of operating a plurality of pump stations feeding a wastewater treatment facility, wherein the plurality of pump stations is positioned exterior to the wastewater treatment facility so as to move wastewater from a position exterior to the wastewater treatment facility to a position interior to the wastewater treatment facility for treatment, the method comprising the step of controlling operation of the plurality of pump stations in a systematic fashion from a central location by activating pumps at the plurality of pump stations in order of distance from the wastewater treatment facility from farthest to nearest by manipulating a threshold level of activation for the plurality of pump stations;

wherein the step of controlling the operation of pump stations in a systematic fashion includes allowing the wet wells of one or more pump stations to fill to a secondary lead level and activating a sufficient number of pumps at one or more pump stations to pump down the wet wells at a rate sufficient to cause flow in a force main to exceed a scour speed for the force main, to thereby flush the force main by manipulating the threshold level of activation for the wet wells.

14. The method of claim 13 in which wet wells of the plurality of pump stations on a force main are pumped down prior to starting of a peak flow period.

15. The method of claim 13 in which the step of controlling the operation of the plurality of pump stations in a systematic fashion comprises the steps of:

a. notifying the central location from each pump station of a status of a wet well and identifying of any pumps running;

b. receiving a command from the central location if any relatively small pump is running on a force main to increase the threshold level of activation of the pumps at the pump stations associated with relatively larger pumps on that force main; and c. if no relatively smaller pumps are operating, receiving a command from the central location to activate larger pumps at full pressure output by manipulating the threshold level of activation for the wet wells so that no relatively smaller pumps are operating on the force main at the same time that a larger pump is running on that force main.

16. The method of claim 13 in which the step of controlling the operation of the plurality of pump stations in a systematic fashion comprises the steps of:

a. identifying pump stations on a force main that do not pump wet wells at said pump station down to a lowest level at least twice a day; and b. for each pump station identified, activating one or more pumps by manipulating the threshold level of activation for the wet wells twice a day to reduce levels in the wet wells to a point where septic conditions are minimized.

* * * * *